United States Patent [19]
St. Germain

[11] 3,838,235
[45] Sept. 24, 1974

[54] CABLE TENSION RESPONSIVE SWITCH

[75] Inventor: Jean St. Germain, St. John, Quebec, Canada

[73] Assignee: Andre H. Baron, East Montreal, Canada

[22] Filed: Apr. 16, 1973

[21] Appl. No.: 351,533

[52] U.S. Cl. ............................................. 200/61.18
[51] Int. Cl. ...................... B65h 25/14, B65h 25/22
[58] Field of Search ............ 200/161, 61.18, 153 F, 200/153 W; 340/259

[56] References Cited
UNITED STATES PATENTS
| | | | |
|---|---|---|---|
| 2,187,575 | 1/1940 | Schroder | 200/61.18 X |
| 2,643,306 | 6/1953 | Hamilton | 200/61.18 |

FOREIGN PATENTS OR APPLICATIONS
| | | | |
|---|---|---|---|
| 962,745 | 7/1964 | Great Britain | 200/153 W |

Primary Examiner—Robert K. Schaefer
Assistant Examiner—William J. Smith

[57] ABSTRACT

An electrical switch which is responsive to cable tensioning. The switch is directly suspended from a cable, such as the brake cable of a motorcycle, snowmobile or other vehicle. A plunger is hooked to the cable between two portions of the switch housing abutting the cable; a spring urges the plunger to kink the cable when tension is released; tensioning of the cables moves the plunger out of its normal position, thereby operating the electrical contact associated with the plunger. The electrical switch not only eliminates securing the switch housing to a fixed part but also does not require any further adjustment when the brake is adjusted.

4 Claims, 4 Drawing Figures

PATENTED SEP 24 1974  3,838,235

CABLE TENSION RESPONSIVE SWITCH

The present invention relates to an electrical switch and, more particularly, to an electrical switch which is responsive to cable tensioning. In motorcycles, snowmobiles and the like wherein a brake is actuated by a flexible cable, the electrical switch controlling the brake light and responsive to cable tensioning is usually attached to a fixed part of the vehicle with a rope attached to the brake cable and to the switch actuator. This necessitates the operation of securing the switch housing to a fixed part and, moreover, whenever the brake is adjusted, resulting in longitudinal displacement of the brake cable, the attachment of the switch to the brake cable, or the fixation of the switch housing, must also be adjusted.

The general object of the invention is to provide an electrical switch which obviates the above-noted disadvantage and, more particularly, which is directly attached to, or suspended from, the brake cable, so as to be operated thereby upon cable tensioning, thereby eliminating brackets or supports for securing the switch to a stationary part of the vehicle and also eliminating any need for adjustment of the operative connection between the cable and the switch or of the fixation of the switch housing.

Other objects of the invention reside in the provision of a switch of the character described, which can be attached to any control cable subjected to alternate tensioning and release, which is simple and inexpensive to manufacture and which is very quickly installed.

The foregoing and other objects of the invention will become more apparent during the following disclosure and by referring to the drawings, in which.

In the drawings, like reference characters indicate like elements throughout.

Figure 1:
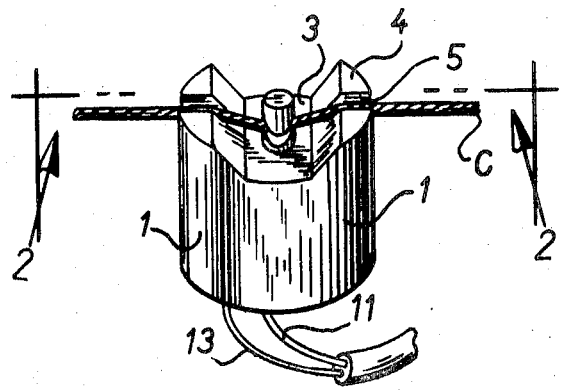
FIG. 1 is a perspective view of the switch of the invention suspended from a control cable in released condition.
Figure 2:
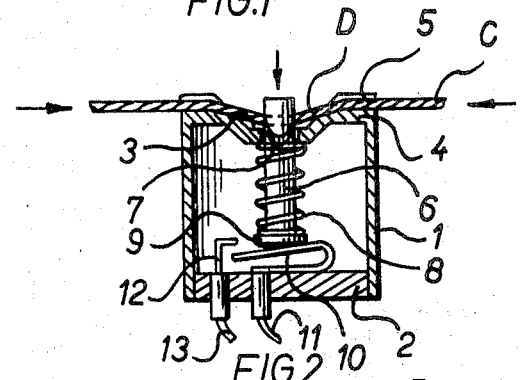
FIG. 2 is a section through the switch, taken along line 2—2 of FIG. 1.

The switch of the invention comprises a cylindrical housing 1, which may be made of molded synthetic resin having a press-fit cover 2 at one end, while its other end forms a central recessed portion 3 intermediate two lateral wings or bosses 4, each provided with a groove 5, the two grooves being in alignment along an axis perpendicular to the longitudinal axis of the cylindrical housing 1.

A plunger 6 extends within the housing 1, being slidably inserted through a bore 7 made in recessed central portion 3. Plunger 6 is movable along an axis coaxial with the longitudinal axis of housing 1, that is perpendicular to the common longitudinal axis of the two aligned grooves 5 and disposed intermediate said grooves.

A compression coil spring 8 surrounds plunger 6, abuts against the housing 1 around bore 7 at one end, while its other end abuts an enlarged head 9 at the inner end of the plunger. Head 9 rests on a resilient movable electrical contact 10 secured to the cover 2 and having an electrical lead 11 connected thereto and extending through the cover 2. A stationary electrical contact 12 is also secured to cover 2 and extends therethrough, being connected to an electrical lead 13. The two contacts are electrically insulated. The outer end of the plunger 6, namely the end extending outwardly of the housing 1, is provided with cable hooking means in the form of a laterally opening notch 14, which is inclined towards the inner end or head 9 of the plunger from the bottom of notch 14 to its lateral opening.

In released condition, the plunger 6 is urged by spring 8 to move contact 10 out of abutment with stationary contact 12, so as to open the electrical circuit between leads 11 and 13. In this position, the bottom of notch 14 is inwardly offset from the line joining grooves 5.

Figure 3:
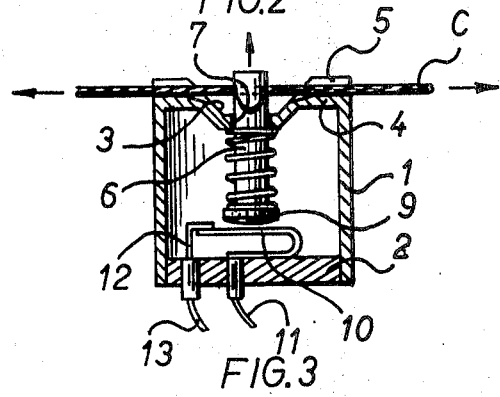
FIG. 3 is a similar section but with the cable in tensioned condition.
Figure 4:
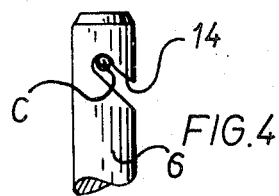
FIG. 4 is a partial side elevation of the switch plunger and showing the cable in cross-section.

The switch is used and operates as follows:

It is easily suspended from a control cable C in the manner shown in FIG. 1 with the cable engaging the notch 14 of plunger 6 and the grooves 5 of housing 1 on each side of the plunger. When the cable is not under tension, spring 8 has sufficient force not only to open contacts 10, 12 but also to make a bend D in the cable C, whereby the cable portion intermediate grooves 5 is offset inwardly with respect to the portions of the cable resting in groove 5. Upon cable tensioning, as shown in FIG. 3, the cable is straightened out and lifts the plunger 6 with head 9 releasing movable contact 10, which closes the electrical circuit between contacts 10 and 12. Obviously, the electrical contacts 10, 12 could be reversed so as to have switch closing when cable tension is released and switch opening when cable tension takes place.

Also, the manner of attaching or suspending the switch from the cable could be reversed by replacing the grooves 5 by hooks engaging the top side of the cable and by replacing the hook means 14 on the plunger by an end groove engaging the bottom side of the cable and by arranging for the spring 8 to urge the plunger outwardly of the housing, so as to make a reverse bend in the cable, straightening of the cable pushing the plunger inwardly of the casing.

The switch in accordance with the invention can be easily hooked to any control cable subjected to intermittent tensioning, such as a brake cable in a motorcycle, snowmobile or the like, with the switch serving to control the electric circuit of the brake light of the vehicle or any other electrical circuit. In the case of a brake light, the cable C is tensioned to apply the brake, whereby the switch closes the electrical circuit to the brake light. The switch can be installed on the cable at any accessible and convenient place and does not need any adjustment in spite of the fact that the longitudinal position of the brake cable may change as a result of brake adjustment.

What I claim is:

1. An electrical switch adapted to be actuated by a control cable subjected to intermittent tensioning, such as the brake cable of a snowmobile comprising a housing made of electric insulating material, forming an enclosed chamber, and including two spaced apart cable-engaging portions integrally formed therewith at one external face thereof and having aligned grooves adapted to engage spaced zones of one side of said control cable therein, a plunger made of electric insulating material, movably guided in a bore of said housing, projecting into said enclosed chamber, and protruding from said one face intermediate said cable-engaging portions of said housing adapted to engage the opposite side of said cable in a zone intermediate said zones engaged by said cable-engaging housing portions, spring means located in said enclosed chamber, acting on said plunger, urging the latter in a direction to bend said cable when its tension is released, and allowing movement of said plunger in the opposite direction upon tensioning of said cable, electrical switching means enclosed in said chamber and engaging said plunger for responsive movement therewith, and said plunger forming hooking means adapted for hooking said switch and suspend it from said cable.

2. An electrical switch as claimed in claim 1, wherein said housing external face is provided with a central recess intermediate said cable-engaging portions with the latter protruding on both sides relative to said recess, said plunger has a lateral notch forming said hooking means for receiving the zone of said cable intermediate the zones engaged by said aligned grooves, and said spring means operatively biases said plunger in a direction to retract said plunger into said chamber.

3. An electrical switch as claimed in claim 2, wherein said electric switching means includes a movable electrical contact mounted in said chamber in the path of said plunger for direct engagement by the latter.

4. An electrical switch as claimed in claim 2, wherein said housing is cylindrical with an integral end wall and is opened at its other end, a cover made of electric insulating material, press fitted within said open end to close the same and to cooperatively define said enclosed chamber, said end wall integrally forms said central recess and grooves, said plunger has an enlarged head at its end in said chamber, said spring means consists of a compression coil spring surrounding said plunger and abutting against said enlarged head at one end and against said housing end wall at the other end, said electric switching means including a resilient movable electrical contact carried by said cover, on the inner side thereof and directly engageable by said plunger and an inverted L-shaped stationary contact carried by said cover and overlying the free end of said movable contact, and said electric contacts are in circuit closing condition when said plunger is moved away from said movable contact by control cable tensioning.

* * * * *